United States Patent
Anikster et al.

(10) Patent No.: US 10,839,053 B2
(45) Date of Patent: Nov. 17, 2020

(54) SECURE WATERMARK FOR AN ADAPTIVE BITRATE CLIENT

(71) Applicant: Cisco Technology, Inc., San Jose, CA (US)

(72) Inventors: Vered Anikster, Jerusalem (IL); David Livshits, Geva Binyamin (IL); Nadav Ramati, Maccabim-Reut (IL)

(73) Assignee: Cisco Technology, Inc., San Jose, CA (US)

( * ) Notice: Subject to any disclaimer, the term of this patent is extended or adjusted under 35 U.S.C. 154(b) by 232 days.

(21) Appl. No.: 15/990,086

(22) Filed: May 25, 2018

(65) Prior Publication Data

US 2019/0220577 A1    Jul. 18, 2019

Related U.S. Application Data

(60) Provisional application No. 62/616,468, filed on Jan. 12, 2018.

(51) Int. Cl.
*G06F 21/16* (2013.01)
*H04L 29/08* (2006.01)
*H04L 29/06* (2006.01)

(52) U.S. Cl.
CPC ............. *G06F 21/16* (2013.01); *H04L 63/00* (2013.01); *H04L 67/02* (2013.01); *H04L 67/2842* (2013.01); *G06F 2221/0737* (2013.01); *H04L 67/42* (2013.01)

(58) Field of Classification Search
CPC . G06F 21/16; G06F 2221/0737; H04L 63/00; H04L 67/02; H04L 67/2842; H04L 67/42; H04L 63/168; H04L 63/123
See application file for complete search history.

(56) References Cited

U.S. PATENT DOCUMENTS

| | | | |
|---|---|---|---|
| 8,108,879 B1 | 1/2012 | Levy et al. | |
| 8,239,546 B1* | 8/2012 | McGowan | H04L 65/1069 709/227 |
| 8,731,235 B2 | 5/2014 | Boyd et al. | |
| 8,874,779 B2* | 10/2014 | Ma | H04N 21/6437 709/231 |
| 9,270,724 B1* | 2/2016 | Morgan | H04L 63/0435 |
| 9,330,429 B2 | 5/2016 | Barnes et al. | |
| 2002/0143798 A1* | 10/2002 | Lisiecki | H04L 67/1095 |

(Continued)

OTHER PUBLICATIONS

Thorwirth, Niels, "Enabling Watermarking in a Diverse Content Distribution Infrastructure", SMPTE 2015 Annual Technical Conference and Exhibition, Loews Hollywood Hotel, Hollywood, CA, 2015, pp. 1-6. (Year: 2015).*

*Primary Examiner* — Michael Pyzocha
(74) *Attorney, Agent, or Firm* — Merchant & Gould P.C.

(57) ABSTRACT

A watermark in Adaptive Bitrate (ABR) content may be provided. First, a cache miss may be determined in response to receiving a request that includes an address that points to a fake media segment. Next, in response to determining the cache miss, a pull request may be sent to an origin server. The pull request may include an identifier corresponding to a client device. Then, in response to sending the pull request, a redirect response may be received from the origin server. The redirect response may include an address of a real media segment with an embedded watermark.

20 Claims, 4 Drawing Sheets

(56) References Cited

U.S. PATENT DOCUMENTS

| | | | |
|---|---|---|---|
| 2012/0134248 A1* | 5/2012 | Spitzlinger | G11B 20/00282 |
| | | | 369/30.08 |
| 2014/0365491 A1* | 12/2014 | Macaulay | G06F 16/4387 |
| | | | 707/737 |
| 2015/0063567 A1 | 3/2015 | Robert et al. | |
| 2015/0113604 A1* | 4/2015 | Oyman | H04L 67/02 |
| | | | 726/4 |
| 2016/0219091 A1* | 7/2016 | Gabin | H04L 65/605 |
| 2016/0277466 A1* | 9/2016 | Lohmar | H04L 65/4084 |
| 2016/0360288 A1 | 12/2016 | Mandyam et al. | |
| 2017/0118537 A1* | 4/2017 | Stransky-Heilkron | |
| | | | G06F 21/16 |
| 2019/0007756 A1* | 1/2019 | Navali | H04N 21/4408 |
| 2019/0124377 A1* | 4/2019 | Chen | H04N 21/8456 |

\* cited by examiner

US 10,839,053 B2

SECURE WATERMARK FOR AN ADAPTIVE BITRATE CLIENT

RELATED APPLICATION

Under provisions of 35 U.S.C. § 119(e), Applicants claim the benefit of U.S. provisional application No. 62/616,468, filed Jan. 12, 2018, which is incorporated herein by reference.

TECHNICAL FIELD

The present disclosure relates generally to video watermarking.

BACKGROUND

A digital watermark is a marker embedded in a noise-tolerant carrier signal corresponding to audio, video, or image data. The digital watermark may be used to identify ownership of content corresponding to the carrier signal. "Watermarking" is the process of hiding digital information (e.g., the watermark) in the carrier signal. The hidden information may or may not contain a relation to the carrier signal. Digital watermarks may be used to verify the authenticity or integrity of the carrier signal or to show the identity of owners of the underlying content. It is used, for example, for tracing copyright infringements and for banknote authentication.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
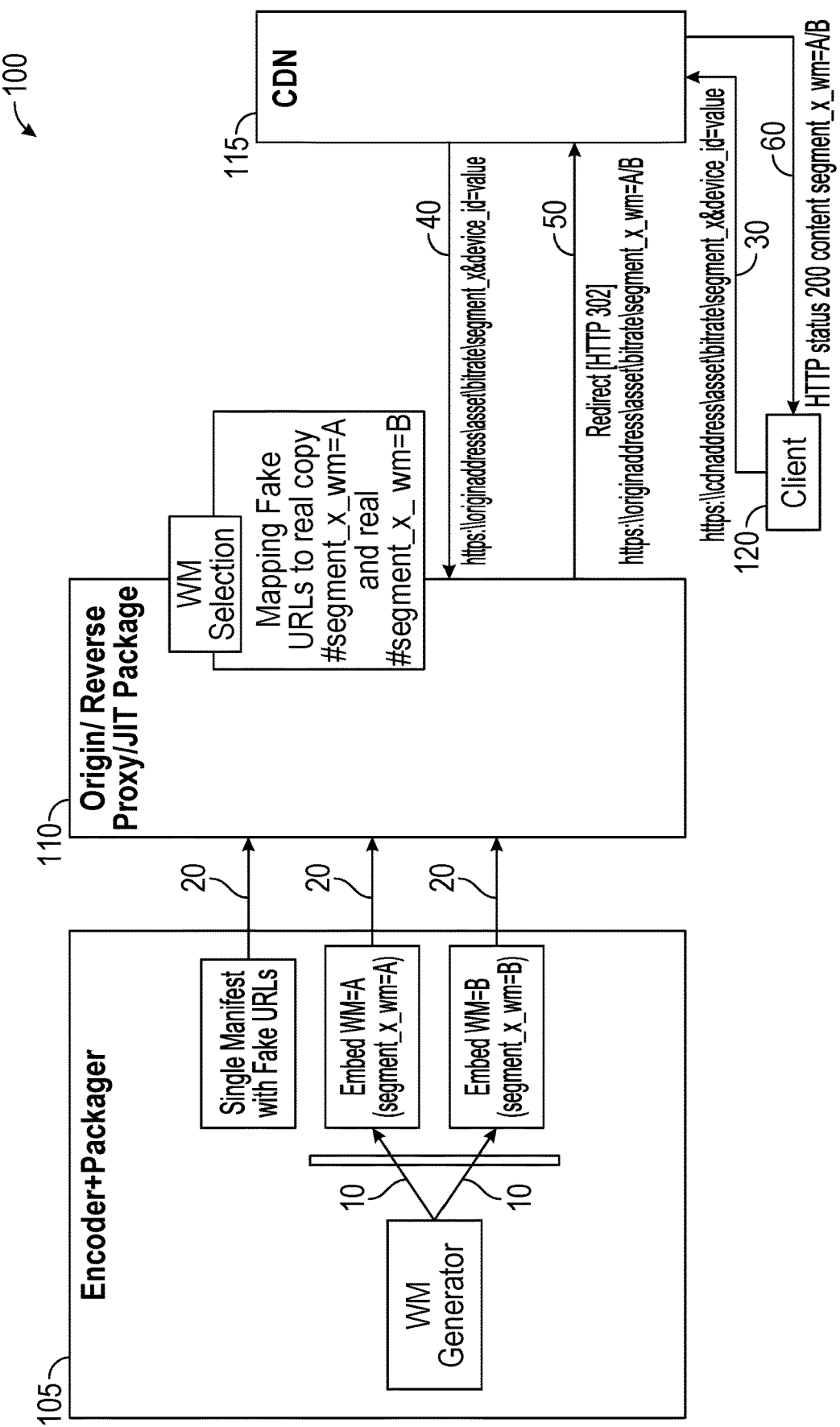
FIG. 1 shows a system for providing a watermark in Adaptive Bitrate (ABR) content.

A watermark in Adaptive Bitrate (ABR) content may be provided. First, a cache miss may be determined in response to receiving a request that includes an address that points to a fake media segment. Next, in response to determining the cache miss, a pull request may be sent to an origin server. The pull request may include an identifier corresponding to a client device. Then, in response to sending the pull request, a redirect response may be received from the origin server. The redirect response may include an address of a real media segment with an embedded watermark.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Video piracy is moving to online redistribution. A watermarking process for Over-The-Top (OTT) Adaptive Bitrate (ABR) content consistent with embodiments of the disclosure may be used to mitigate illicit content redistribution. For example, embodiments of the disclosure may allow content providers to forensically identify a content-sharer source from an imperceptible signal (i.e., a watermark) embedded in the video. With embodiments of the disclosure, watermark signals may be embedded in video content, thus creating multiple variations of the content. Then the content provider may select an appropriate watermark variant in a sequential manner, so that a content consuming device identifier may be signaled.

FIG. 1 shows a system 100 for providing a watermark in ABR content. As shown in FIG. 1, system 100 may comprise an encoder/packager 105, an origin server 110, a content delivery network (CDN) 115, and a client device 120. The origin server 110 may comprise any element in system 100 that may be acting as an origin server for content. FIG. 1 also illustrates states, 10, 20, 30, 40, 50, and 60, which are described in conjunction with FIG. 2 below.

In order for ABR clients (e.g., client device 120) to switch between available representations at chunk boundaries, the chunks of the individual representations may be video frame aligned (and within a chunk, audio may be aligned with video). Consequently, services may be encoded by encoder/packager 105, packaged (i.e., cut in data chunks) by encoder/packager 105, and delivered to client device 120 over CDN 115. Encoder/packager 105 may encode a source to a desired video/audio format and may generate a set of representations of the ABR service (e.g., different resolutions, framerates, and bitrates).

CDN 115 may comprise a geographically distributed network of servers in data centers serving the Internet. Client device 120 may comprise, but is not limited to, a cable modem, a cellular base station, a tablet device, a mobile device, a smart phone, a telephone, a remote control device, a set-top box, a digital video recorder, a personal computer, a network computer, a mainframe, a router, or other similar microcomputer-based device.

Figure 2:
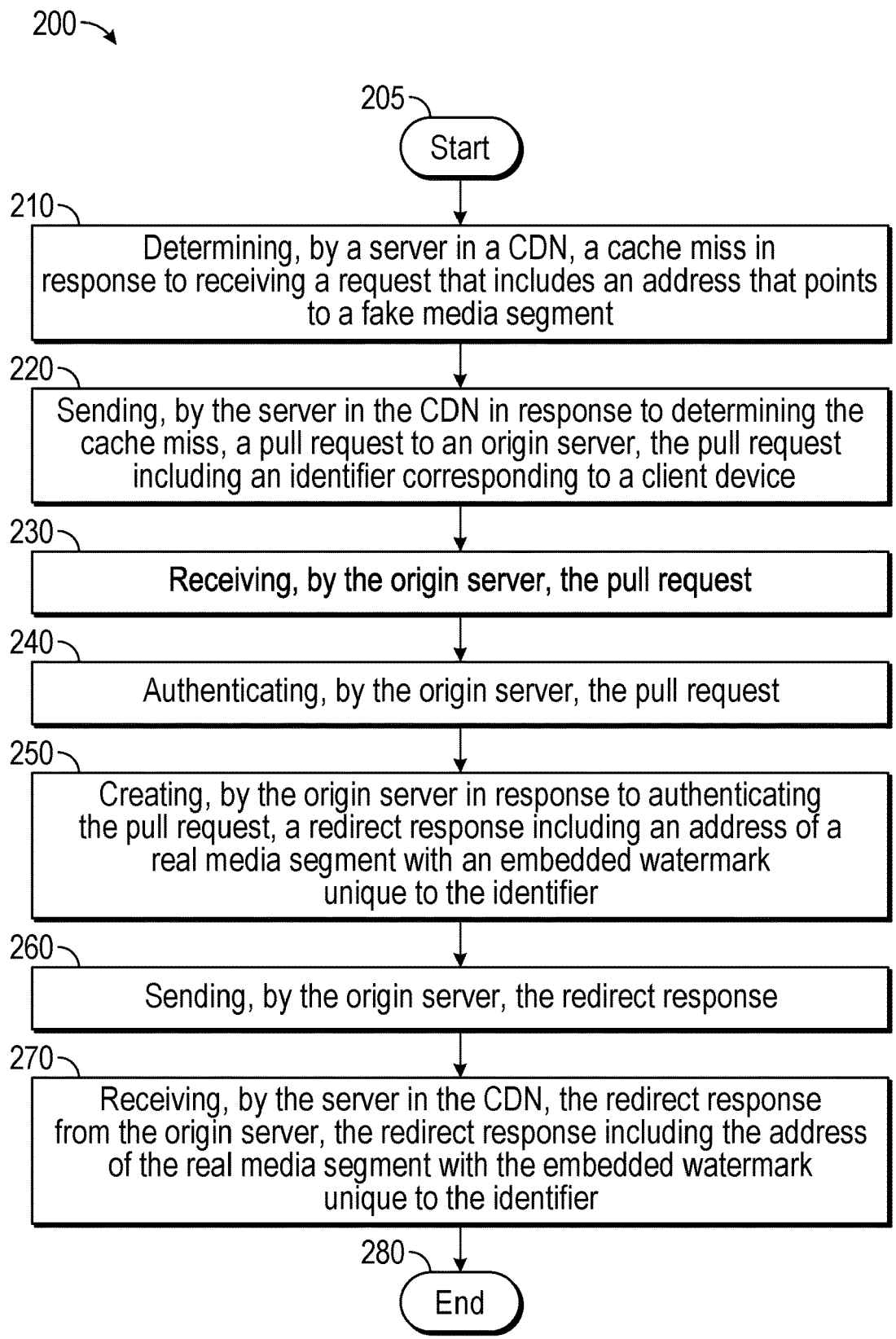
FIG. 2 is a flow chart of a method for providing a watermark in Adaptive Bitrate (ABR) content.

FIG. 2 is a flow chart setting forth the general stages involved in a method 200 consistent with an embodiment of the disclosure for providing a watermark in Adaptive Bitrate (ABR) content. Method 200 may be implemented using origin server 110, a server in CDN 115, and client device 120. A computing device 400, as described in more detail below with respect to FIG. 4, may provide an operating environment for origin server 110, the server in CDN 115, or client device 120. Ways to implement the stages of method 200 will be described in greater detail below.

Method 200 may begin at starting block 205 and proceed to stage 210 where a server in CDN 115 may determine a cache miss in response to receiving a request that includes an address that points to a fake media segment. For example, embodiments of the disclosure may create (state 10 of FIG. 1) two (or more) watermarked-variants of each media segment (e.g., multiplied for each bitrate/resolution ABR representation of the stream). The media segments may be duplicated to create, for example, A and B watermarked-variants. In addition, a legitimate manifest with fake media segment Uniform Resource Locators (URLs) may be created. Media segments of each bitrate/resolution may be duplicated with a different watermark value inside and the media manifest that may point to the non-available (i.e., fake) segments (state 20 of FIG. 1).

Embodiments of the disclosure may perform secure personalized AB selection. The same master manifest, and in the case of Hypertext Transfer Protocol (HTTP) Live Streaming (HLS), the same media manifests, may be delivered to clients including client device 120. The client's ID may be appended to HTTP requests sent to CDN 115 (or multiple CDNs, or any other caching solution). The client ID value may be a native Digital Rights Management's (DRM's) device ID or any other unique identifier. This device ID may be passed using any other standard or non-standard HTTP way to CDN 115.

The master manifest or, in the case of HLS, the media manifest, may contain URLs addressing non-existing video media segment addresses. Therefore, when client device 120 sends HTTPs requests (state 30 of FIG. 1) to those media segments, the CDN 115 may experience a "cache miss". Consistent with embodiments of the disclosure, a cache miss may comprise a state where content requested from CDN 115 by a user of client device 120 may not be found in the cache. In response, CDN 115 may perform a pull request (state 40 of FIG. 1) from origin server 110 (or from any cache server in the chain). In this way, embodiments of the disclosure may support standard clients and CDNs.

From stage 210, where the server in CDN 115 determines the cache miss, method 200 may advance to stage 220 where the server in CDN 115 may send, in response to determining the cache miss, a pull request to origin server 110. The pull request may include an identifier corresponding to client device 120.

Once the server in CDN 115 sends the pull request in stage 220, method 200 may continue to stage 230 where origin server 110 may receive the pull request. For example, the pull request (from state 30 of FIG. 1) may arrive at origin server 110 (or at a component that functions as the origin for CDN 115). Origin server 110 may comprise a forward or backward proxy, or any other implementation of a CDN origin for example.

After origin server 110 receives the pull request in stage 230, method 200 may proceed to stage 240 where origin server 110 may authenticate the client that has initiated the pull request. For example, origin server 110 may resolve the received client identifier. For example, embodiments of the disclosure may use a secure cookie or equivalent other technique for authentication. This secure cookie may be generated and secured (e.g., encrypted and signed) by a server that has previously (e.g., at session startup time) authenticated the client. Accordingly, this cookie may contain a real (not fictional) client identifier. The cookie may not require any crypto processing on the client side. The cookie and the client identifier within it may be generated by a server with some standard solution that may allow origin server 110 to validate the identifier. Even adding the cookie as a query string may not require a change to a client application as the query string may be part of the URL generated by the right component of the control plane. Origin server 110 may then select the watermark variant according to a watermark selection process.

From stage 240, where origin server 110 authenticates the pull request, method 200 may advance to stage 250 where origin server 110 may create, in response to authenticating the pull request, a redirect response including an address of a real media segment with an embedded watermark unique to the identifier. For example, origin server 110 may then respond (state 50 of FIG. 1), for example, with a "temporary redirect response" (302) addressing a real video media segment with a watermark embedded. Accordingly, embodiments of the disclosure may implement actual personalized selection of watermark-variants to create the AB personalized watermark of the content for each user/device (e.g., client device 120). In addition, centralizing the watermark selection process may enable centralized upgrades and corrections as needed.

Once origin server 110 creates the redirect response in stage 250, method 200 may continue to stage 260 where origin server 110 may send the redirect response. After origin server 110 sends the redirect response in stage 260, method 200 may proceed to stage 270 where the server in the CDN 115 may receive the redirect response from origin server 110. The redirect response may include the address of the real media segment with the embedded watermark unique to the identifier. For example, if the targeted redirected resource is already cached in CDN 115, then the media segment may be returned by CDN 115 to client device 120. Otherwise, CDN 115 may perform another request back to origin server 110 to upload the media segment. In either case, the media segment may be downloaded to client device 120 (state 60 of FIG. 1).

Consequently, embodiments of the disclosure may take advantage and maximizes efficiency of the caching infrastructures provided by CDNs, local proxies, and/or the HTTP caching capability. Although there may be communication back to origin server 110 for each segment request, these extra calls may add low overhead because they may be used for (standard) redirection. There may be no extra traffic of content segments created by this process because the content may be cached on CDN 115. CDN 115 may enable caching of the result of the redirect response, for example, by turning on the related configuration option. Once the server in the CDN 115 receives the redirect response in stage 270, method 200 may then end at stage 280.

Figure 3:
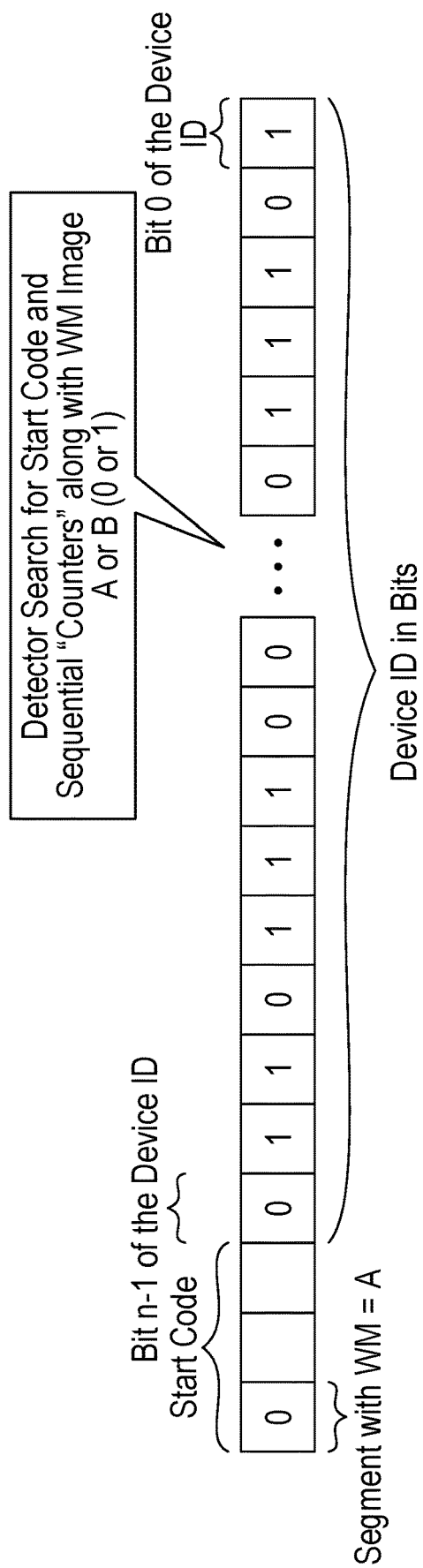
FIG. 3 shows an example of watermark detection.

FIG. 3 shows an example of watermark detection. In this example, the sequence of segments delivered to client device 120 may be personalized according to the device ID where each segment may contain one bit of the client ID. A watermark detector, during the playback of certain amount of segments, may be able to detect the client ID. The watermark ID itself may contain additional signaling, such as a start code of a few bits for synchronizing the watermark detector and process to mitigate illicit content redistribution.

Figure 4:
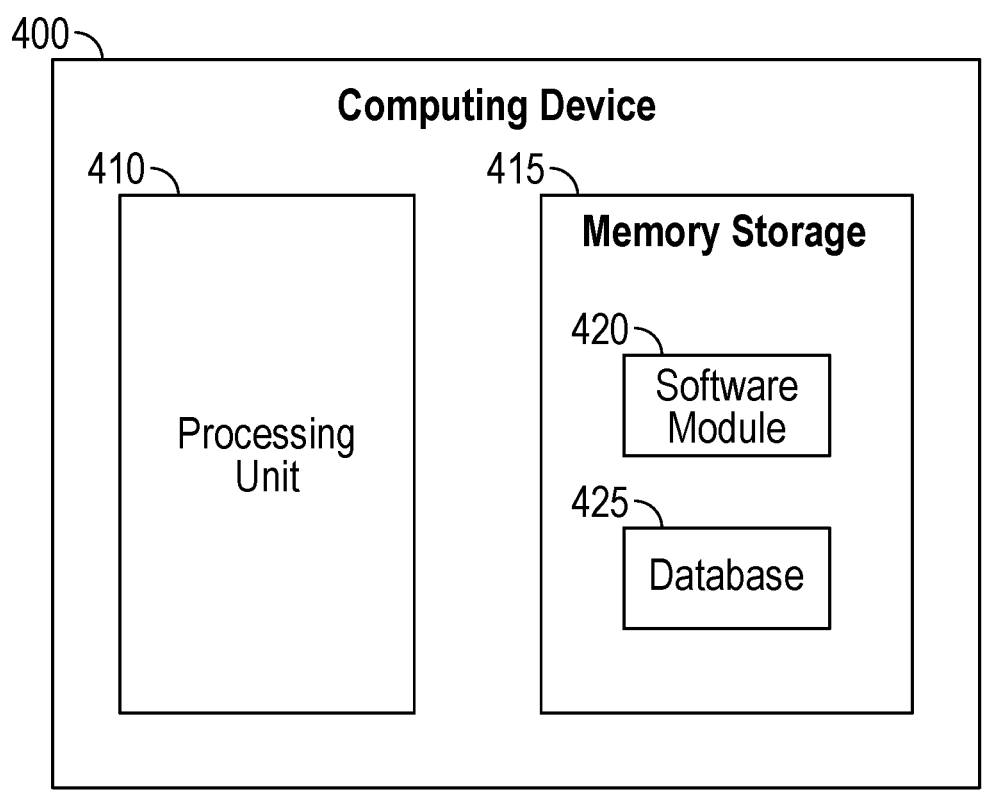
FIG. 4 is a block diagram of a computing device.

FIG. 4 shows computing device 400. As shown in FIG. 4, computing device 400 may include a processing unit 410 and a memory storage 415. Memory storage 415 may include a software module 420 and a database 425. While executing on processing unit 410, software module 420 may perform processes for providing a watermark in Adaptive Bitrate (ABR) content described above with respect to FIG. 2. Computing device 400, for example, may provide an operating environment for encoder/packager 105, origin server 110, elements (e.g., servers) of CDN 115, and client device 120. Encoder/packager 105, origin server 110, elements of CDN 115, and client device 120 may operate in other environments and are not limited to computing device 400.

Computing device 400 may be implemented using a personal computer, a network computer, a mainframe, a router, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    determining a cache miss in response to receiving a request that includes an address that points to a fake media segment, wherein the address that points to the fake media segments comprises a Uniform Resource Locator (URL) in a manifest file, the URL pointing to a non-existent media segment;
    sending, in response to determining the cache miss, a pull request to an origin server, the pull request including an identifier corresponding to a client device; and
    receiving, in response to sending the pull request, a redirect response from the origin server, the redirect response including an address of a real media segment with an embedded watermark unique to the identifier.

2. The method of claim 1, further comprising downloading to the client device, in response to receiving the redirect response between the origin server and a content delivery network, the real media segment with the embedded watermark unique to the identifier.

3. The method of claim 1, wherein determining the cache miss in response to receiving the request comprises determining the cache miss in response to receiving the request from the client device.

4. The method of claim 1, wherein determining the cache miss in response to receiving the request comprises determining the cache miss in response to receiving the request from the client device via Hyper Text Transfer Protocol Secure (HTTPS).

5. The method of claim 1, wherein sending the pull request to the origin server comprises sending the pull request by a server in a content delivery network.

6. The method of claim 1, further comprising receiving, by the origin server from, the pull request.

7. The method of claim 6, further comprising resolving, by the origin server, the pull request.

8. The method of claim 7, further comprising creating, by the origin server in response to authenticating the pull request, the redirect response including the address of the real media segment with the embedded watermark unique to the identifier.

9. The method of claim 8, further comprising sending, by the origin server, the redirect response.

10. A non-transitory computer-readable medium that stores a set of instructions which when executed perform a method, the method executed by the set of instructions comprising:
    determining a cache miss in response to receiving a request that includes an address that points to a fake media segment, wherein the address that points to the fake media segments comprises a Uniform Resource Locator (URL) in a manifest file, the URL pointing to a non-existent media segment;
    sending, in response to determining the cache miss, a pull request to an origin server, the pull request including an identifier corresponding to a client device; and
    receiving, in response to sending the pull request, a redirect response from the origin server, the redirect response including an address of a real media segment with an embedded watermark unique to the identifier.

11. The non-transitory computer-readable medium of claim 10, further comprising downloading to the client device, in response to receiving the redirect response, the real media segment with the embedded watermark unique to the identifier.

12. The non-transitory computer-readable medium of claim 10, wherein determining the cache miss in response to receiving the request comprises determining the cache miss in response to receiving the request from the client device.

13. The non-transitory computer-readable medium of claim 10, wherein determining the cache miss in response to receiving the request comprises determining the cache miss in response to receiving the request from the client device via Hyper Text Transfer Protocol Secure (HTTPS).

14. A system comprising:
    a first memory storage; and
    a first processing unit coupled to the first memory storage, wherein the first processing unit is operative to:
        receive a pull request in response to a cache miss in response to a request that includes an address that points to a fake media segment, wherein the address that points to the fake media segments comprises a Uniform Resource Locator (URL) in a manifest file, the URL pointing to a non-existent media segment;
        authenticate the pull request;
        create, in response to authenticating the pull request, a redirect response including an address of a real media segment with an embedded watermark unique to an identifier; and
        send the redirect response.

15. The system of claim 14, further comprising:
    a second memory storage; and
    a second processing unit coupled to the second memory storage, wherein the second processing unit is operative to determine the cache miss in response to receiving the request that includes the address that points to the fake media segment.

16. The system of claim 15, wherein the second processing unit is further operative to send, in response to determining the cache miss, the pull request to the first processing unit, the pull request including the identifier corresponding to a client device.

17. The system of claim 16, wherein the second processing unit is further operative to receive, in response to sending the pull request, the redirect response from the first processing unit, the redirect response including the address of the real media segment with the embedded watermark unique to the identifier.

18. The system of claim 17, wherein the second processing unit is further operative to download to the client device, in response to receiving the redirect response, the real media segment with the embedded watermark unique to the identifier.

19. The system of claim 18, wherein the second processing unit being operative to determine the cache miss in response to receiving the request comprises the second processing unit being operative to determine the cache miss in response to receiving the request from the client device.

20. The system of claim 18, wherein the second processing unit being operative to determine the cache miss in response to receiving the request comprises the second processing unit being operative to determine the cache miss in response to receiving the request from the client device via Hyper Text Transfer Protocol Secure (HTTPS).

* * * * *